(12) United States Patent
Lee et al.

(10) Patent No.: US 8,724,561 B2
(45) Date of Patent: May 13, 2014

(54) APPARATUS AND METHOD FOR RESOURCE ALLOCATION INFORMATION TRANSMISSION IN MOBILE COMMUNICATION SYSTEM

(75) Inventors: Sang-Min Lee, Seoul (KR); Eun-Yong Kim, Hwaseong-si (KR); Joon-Young Cho, Suwon-si (KR); Ju-Ho Lee, Suwon-si (KR); Tak-Ki Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 12/797,843

(22) Filed: Jun. 10, 2010

(65) Prior Publication Data

US 2010/0318871 A1 Dec. 16, 2010

(30) Foreign Application Priority Data

Jun. 10, 2009 (KR) .................. 10-2009-0051588

(51) Int. Cl.
*H04W 4/00* (2009.01)
*H04L 5/00* (2006.01)

(52) U.S. Cl.
CPC ............ *H04L 5/0053* (2013.01); *H04L 5/0037* (2013.01)
USPC ........................................ 370/329

(58) Field of Classification Search
CPC ... H04L 1/0038; H04L 1/1854; H04L 5/0037; H04L 5/0044; H04L 5/0053; H04L 27/2601; H04L 1/1812
USPC ............. 370/329, 332, 345; 455/509
See application file for complete search history.

(56) References Cited

U.S. PATENT DOCUMENTS

| | | | |
|---|---|---|---|
| 2006/0251015 A1 | 11/2006 | Khan | |
| 2009/0300456 A1* | 12/2009 | Pelletier et al. | 714/749 |
| 2010/0195583 A1* | 8/2010 | Nory et al. | 370/329 |
| 2010/0279628 A1* | 11/2010 | Love et al. | 455/70 |
| 2011/0111785 A1* | 5/2011 | Lindoff et al. | 455/513 |

FOREIGN PATENT DOCUMENTS

| | | |
|---|---|---|
| KR | 10-2009-0026724 A | 3/2009 |
| WO | 2010/123257 A2 | 10/2010 |
| WO | 2010/127300 A2 | 11/2010 |

\* cited by examiner

*Primary Examiner* — Pao Sinkantarakorn
*Assistant Examiner* — Richard K Chang
(74) *Attorney, Agent, or Firm* — Jefferson IP Law, LLP

(57) ABSTRACT

An apparatus and method for resource allocation information transmission is provided. The method includes determining a search space for use in a second frequency band using resource allocation information of a first process detected in a first frequency band, detecting resource allocation information using the search space in the second frequency band, and when failing to decode received data according to the resource allocation information detected in the second frequency band, re-detecting resource allocation information of the first process in the second frequency band in a first time interval using the search space without detecting the resource allocation information of the first process in the first frequency band.

17 Claims, 15 Drawing Sheets

APPARATUS AND METHOD FOR RESOURCE ALLOCATION INFORMATION TRANSMISSION IN MOBILE COMMUNICATION SYSTEM

PRIORITY

The present application claims the benefit under 35 U.S.C. §119(a) of a Korean patent application filed in the Korean Intellectual Property Office on Jun. 10, 2009 and assigned Serial No. 10-2009-0051588, the entire disclosure of which is hereby incorporated by reference.

BACKGROUND OF THE INVENTION

1. Field of the Invention

The present invention relates to an apparatus and a method for transmitting resource allocation information. More particularly, the present invention relates to a carrier aggregation system in which a user equipment can simultaneously transmit and receive data using a plurality Component Carriers (CCs).

2. Description of the Related Art

Recently, research has been conducted on methods for using carrier aggregation that allow one user equipment to simultaneously transmit and receive data using a plurality of carriers in a mobile communication system. Herein, each carrier constituting the plurality of carriers usable by the user equipment is referred to as a Component Carrier (CC). A CC is also called a fundamental unit of an operable frequency band of the system, that is, a Frequency Assignment (FA). In a carrier aggregation system, the user equipment, which transmits and receives data using the multiple carriers at the same time, needs to detect resource allocation information of the carriers together.

However, methods for transmitting and encoding the resource allocation information of the carriers or the CCs are not yet specified. In this regard, there is a requirement for a concrete method for effectively transmitting the resource allocation information of the CC.

Therefore, a need exists for an apparatus and method for transmitting resource allocation information in a mobile communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for transmitting resource allocation information in a mobile communication system.

Another aspect of the present invention is to provide an apparatus and a method for transmitting resource allocation information of low blind decoding complexity in a mobile communication system.

Yet another aspect of the present invention is to provide an apparatus and a method for allowing Hybrid Automatic Repeat reQuest (HARQ) retransmission of a non-anchor CC alone and simultaneously maintaining low blind decoding complexity.

In accordance with an aspect of the present invention, a method for receiving resource allocation information in a mobile communication system is provided. The method includes determining a search space for use in a second frequency band using resource allocation information of a first process detected in a first frequency band, detecting resource allocation information using the search space in the second frequency band, and when failing to decode received data according to the resource allocation information detected in the second frequency band, re-detecting resource allocation information of the first process in the second frequency in a first time interval using the search space without detecting the resource allocation information of the first process in the first frequency band.

In accordance with another aspect of the present invention, an apparatus for receiving resource allocation information in a mobile communication system is provided. The apparatus includes a controller for determining a search space for use in a second frequency band using resource allocation information of a first process detected in a first frequency band, for detecting resource allocation information using the search space in the second frequency band, and, when failing to decode received data according to the resource allocation information detected in the second frequency band, for re-detecting resource allocation information of the first process in the second frequency in a first time interval using the search space without detecting the resource allocation information of the first process in the first frequency band.

In accordance with yet another aspect of the present invention, a method for transmitting resource allocation information in a mobile communication system is provided. The method includes, when generating resource allocation information for retransmission, generating the resource allocation information such that a resource for the retransmission is not included in a first frequency band and is included only in a second frequency band, determining a transmission resource using the resource allocation information, and transmitting the resource allocation information to a receiver over the transmission resource.

In accordance with still another aspect of the present invention, an apparatus for transmitting resource allocation information in a mobile communication system is provided. The apparatus includes a controller for, when generating resource allocation information for retransmission, generating the resource allocation information such that a resource for the retransmission is not included in a first frequency band and is included only in a second frequency band, and for determining a transmission resource using the resource allocation information, and a transmitter for transmitting the resource allocation information to a receiver over the transmission resource.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiment of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for transmitting resource allocation information in a mobile communication system.

In a carrier aggregation system, a User Equipment (UE) simultaneously transmits and receives data using a plurality of Component Carriers (CCs) and thus needs to detect resource allocation information of the CCs together.

There are various resource allocation information transmitting methods depending on whether the resource allocation information of the CCs are encoded together or per CC and which CC carries the encoded resource allocation information.

The carrier aggregation system is newly adopted by the Institute of Electrical and Electronics Engineers (IEEE) 802.16m and the 3rd Generation Partnership Project (3GPP) Long Term Evolution (LTE)-Advanced and its standardization is under way. The carrier aggregation system is also called a multi-carrier system, a multi-Frequency Assignment (FA) system, and a frequency overlay system. Herein, the bandwidth of the CC, for example, can be determined as the bandwidth of the IEEE 802.16 and the LTE system.

Figure 1:
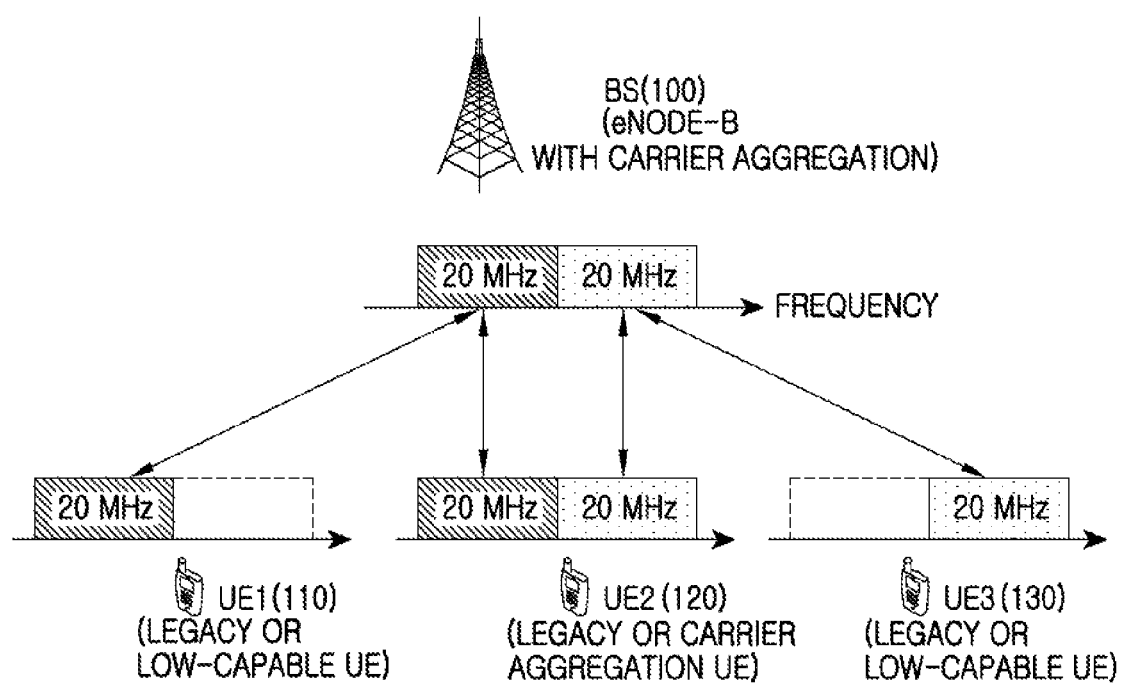
FIG. 1 illustrates a carrier aggregation system according to an exemplary embodiment of the present invention.

FIG. 1 illustrates a carrier aggregation system according to an exemplary embodiment of the present invention.

Referring to FIG. 1, an eNode B 100 transmits and receives data using a plurality of CCs. UEs 110, 120 and 130 can differently set the number and the range of the CCs to transmit and receive, based on their capability.

When carrier aggregation is employed in the mobile communication system, it is necessary to acquire resource allocation information of each CC. Blind decoding is used by the UE to obtain its corresponding resource allocation information in the allocated resource, that is, in the CC. Rather than directly obtaining the resource allocation information from separate control information, blind decoding allows only a particular UE to succeed in decoding according to a preset rule. In general, blind decoding does not include a UE Identifier (ID) in the resource allocation information. The resource allocation information of each UE is transmitted such that it is decoded only by the UE using its ID to decode the information. For instance, the eNode B transmits the resource allocation information by scrambling or masking the UE ID with all or part of the resource allocation information including a Cyclic Redundancy Check (CRC), and the UE can obtain the resource allocation information by descrambling or demasking it using its own ID. Advantageously, blind decoding assists in maintaining a small message size of the resource allocation information by not explicitly sending the UE ID. Blind decoding is expected to be used in both the IEEE 802.16m system and the LTE-Advanced system.

According to an exemplary embodiment of the present invention, a method for encoding the resource allocation information of the CC per CC and transmitting the resource allocation information over different physical channels is provided. For example, in the LTE system, the physical channel carrying the resource allocation information can be referred to as a Physical Downlink Control CHannel (PDCCH). The PDCCH is separately given per CC and the resource allocation information of each CC can be transmitted over each PDCCH. However, using carrier aggregation, it is necessary to obtain the resource allocation information of each CC by detecting each CC. As a result, when the resource allocation information is blind-decoded and transmitted, the complexity is increased.

Alternatively, a concept of an anchor CC is introduced in order to lower the blind decoding complexity. Herein, the UE can select its anchor CC from the plurality of CCs, and preferentially detect the resource allocation information in the anchor CC. In an exemplary implementation, the UE searches the resource allocation information in its selected anchor CC, and searches the resource allocation information of non-anchor CCs only when detecting the resource allocation information.

According to an exemplary embodiment of the present invention, a method for setting the anchor CC and non-anchor CC setting provided. The eNode B selects one or more CCs, from the plurality of the operating CCs, as the CCs for use by the UE. The CCs used by the UEs can differ from each other. For example, when the eNode B operates five CCs {CC1, CC2, CC3, CC4, CC5}, the CCs for use by the first UE can be set to {CC1, CC2, CC3} and the CCs for use by the second UE can be set to {CC3, CC4, CC5}.

The eNode B selects one or more CCs from the CCs for use by the UE as the anchor CC of the corresponding UE. In the above-stated example, the anchor CC of the first UE can be set to CC1 and the anchor CC of the second UE can be set to CC3.

The other CCs excluding the anchor CC among the CCs used by the UE become the non-anchor CCs. In the above example, the non-anchor CCs of the first UE are {CC2, CC3}, and the non-anchor CCs of the second UE are {CC4, CC5}.

The anchor and non-anchor CC setting can be carried out during an initial access of the UE, a handover, an eNode B request, a UE request, a radio resource configuration, and the like.

Regarding use of the anchor CC, provided that the UE searches the resource allocation information in the anchor CC and searches the resource allocation information of the other CCs (the non-anchor CCs) only when detecting the resource allocation information in the anchor CC, a method for detecting the resource allocation information when there is no resource allocation information in the anchor CC and the resource allocation information is transmitted only in the non-anchor CC, is required. Furthermore, to search the resource allocation information of the other CCs only when the resource allocation information is detected in the anchor CC as mentioned above, it may be impossible to retransmit Hybrid Auto Repeat reQuest (HARQ) in the non-anchor CC alone. For example, when a transmitter performs an initial HARQ transmission using the anchor CC and the non-anchor CC wherein the transmission in the anchor CC succeeds and the transmission in the non-anchor CC fails, the HARQ retransmission using only the non-anchor CC can take place but may require a complex operation and thus render it infeasible.

Hence, to lower the complexity in the blind decoding as discussed earlier, consideration is given to an exemplary method is provided for limiting a search condition and a search range of the resource allocation information of the non-anchor CC. This method restricts the PDCCH search range in the non-anchor CC according to resource size and location corresponding to the PDCCH detected in the anchor CC. When the LTE system or the IEEE 802.16 system adopts this method, the number of PDCCH decoding times in the anchor CC is limited to 44 and the number of PDCCH decoding times in the non-anchor CC is limited to n ($1 \leq n \leq 44$), thus lowering the overall complexity in the blind decoding.

Figure 2:
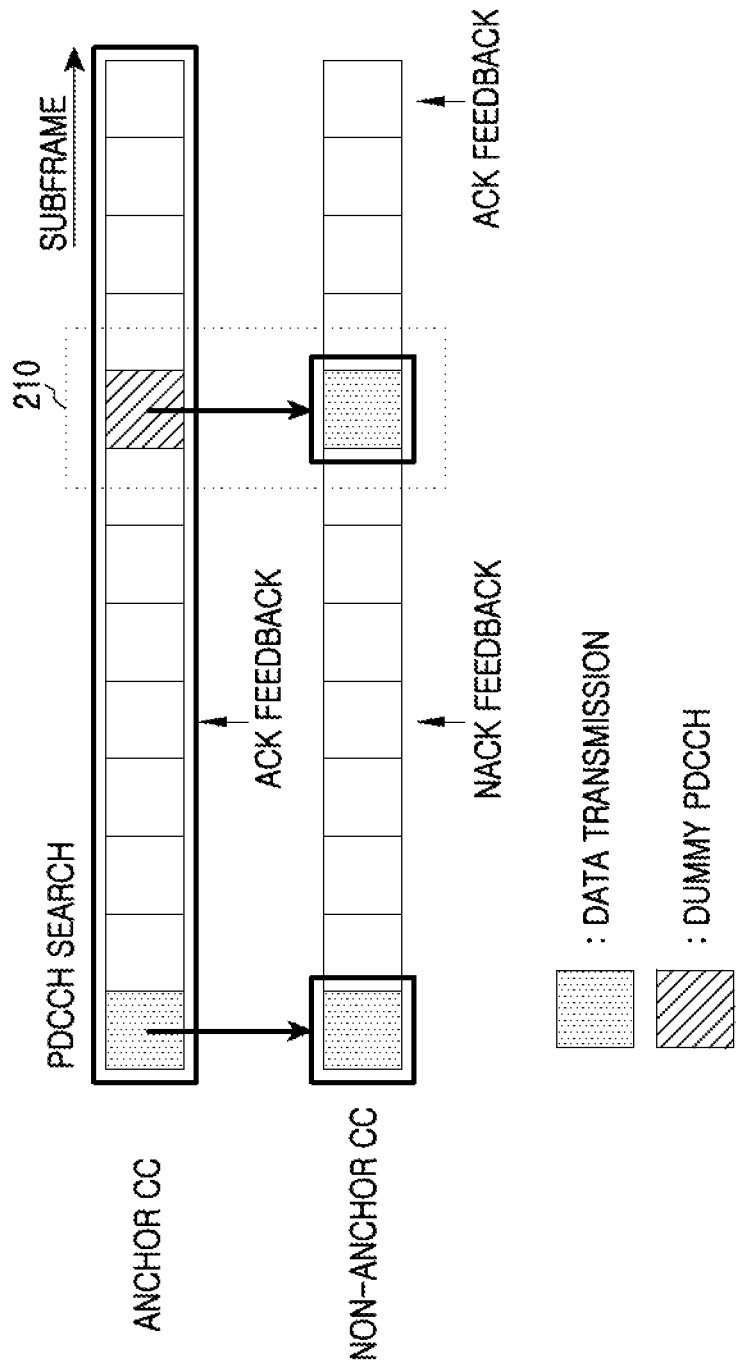
FIG. 2 illustrates a resource allocation transmission process using a dummy Physical Downlink Data CHannel (PDCCH) according to an exemplary embodiment of the present invention.

FIG. 2 illustrates a resource allocation transmission process using a dummy PDCCH according to an exemplary embodiment of the present invention.

Referring to FIG. 2, only upon detecting the dummy PDCCH in the anchor CC can the UE obtain the corresponding resource allocation information in the non-anchor CC in step 210. This implies that the UE obtains the resource allocation information in the non-anchor CC by adding the dummy PDCCH to the anchor CC.

To perform HARQ retransmission only using the non-anchor CC, an exemplary method in which the eNode B does not include dummy resource allocation information in the anchor CC is explained. In the following description, PDCCH detection and resource allocation information detection are regarded as the same expression. In an exemplary implementation, the eNode B can be the transmitter and the UE can be the receiver. However, depending on the object that transmits data, the UE may be the transmitter and the eNode B can be the receiver.

For the UE to search the resource allocation information of the non-anchor CC, an exemplary time interval setting method for searching the resource allocation information of the non-anchor CC is described.

When detecting the resource allocation information in the anchor CC, the UE searches the resource allocation information in subframes of the non-anchor CC of the same time. Also, if the resource allocation information is not detected in the anchor CC, the UE searches the resource allocation information in the subframes of the non-anchor CC predicted to contain the resource allocation information for the HARQ retransmission.

As for a synchronous HARQ process, the predicted time interval of the resource allocation information for the HARQ retransmission becomes one subframe defined by a HARQ retransmission period. Thus, the UE searches the resource allocation information of the non-anchor CC in the one defined subframe.

Figure 3:
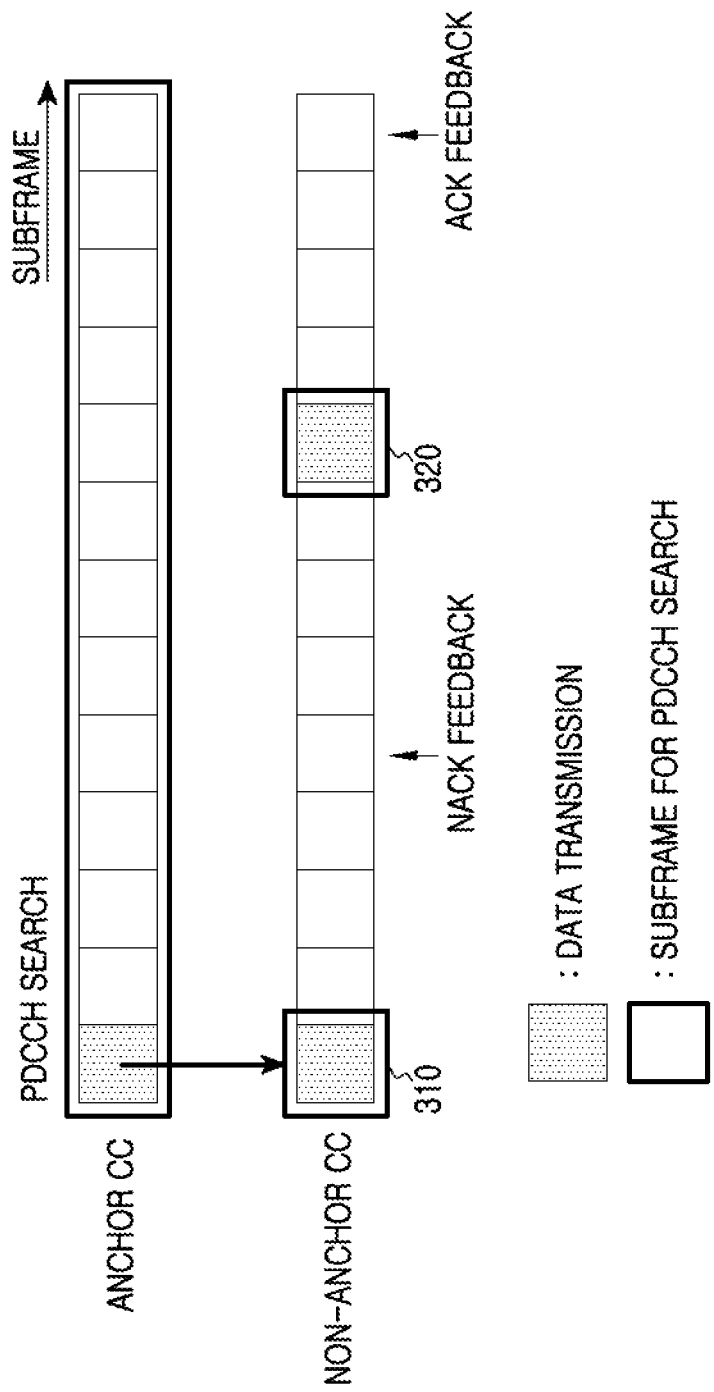
FIG. 3 illustrates a resource allocation information searching process using synchronous Hybrid Automatic Repeat reQuest (HARQ) in a downlink according to an exemplary embodiment of the present invention.

FIG. 3 illustrates a resource allocation information searching process using synchronous HARQ in the downlink according to an exemplary embodiment of the present invention.

Referring to FIG. 3, it is assumed that the synchronous HARQ is set to conduct the HARQ retransmission after seven subframes. When the UE detects the PDCCH in the anchor CC, that is, when the UE detects the resource allocation information but fails to detect the PDCCH 310 in the non-anchor CC, the UE detects the PDCCH 320 in the eighth subframe after the seven subframes in the non-anchor CC.

Figure 4:
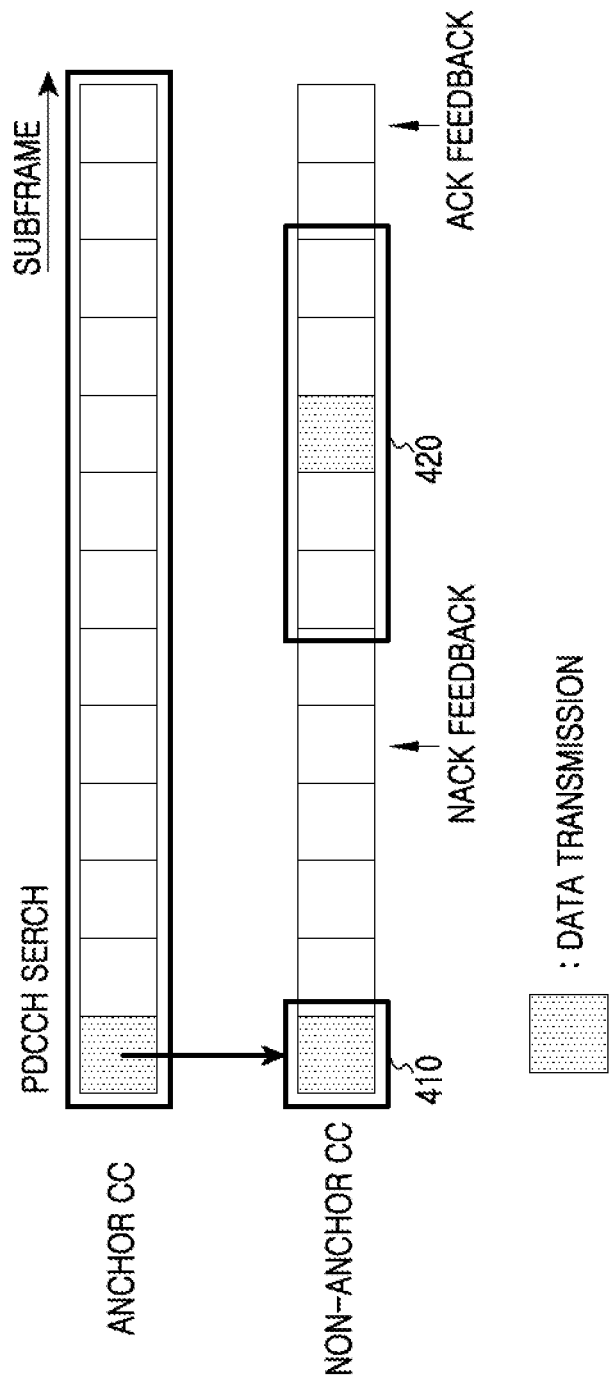
FIG. 4 illustrates a time interval setting method for searching the resource allocation information using asynchronous HARQ in the downlink according to an exemplary embodiment of the present invention.

FIG. 4 illustrates a time interval setting method for searching the resource allocation information using asynchronous HARQ in the downlink according to an exemplary embodiment of the present invention.

In an asynchronous HARQ process, when HARQ retransmission is necessary, a subframe time interval for searching the resource allocation information can be determined as follows.

Referring to FIG. 4, when the UE fails to detect data 410 in a random HARQ process, it sends Negative ACKnowledgement (NACK) feedback. When the number of the current HARQ retransmissions is smaller than the maximum number of the retransmissions, the UE sets a HARQ retransmission prediction subframe interval 420 after two subframes based on the subframe transmitting the NACK feedback and searches resource allocation information in this interval 420.

When the UE succeeds in detecting data using the HARQ process, the resource allocation information search time interval ends in the subframe of success. On the other hand, if no data is detected using the corresponding HARQ process, this implies that the necessary size of the search time interval is greater than a specific value. When a certain time passes after the search, the UE finishes the search.

For example, when HARQ retransmission is possible for a maximum of N subframes after the previous transmission, the search time interval spans the next N subframes after the previous transmission.

Figure 5:
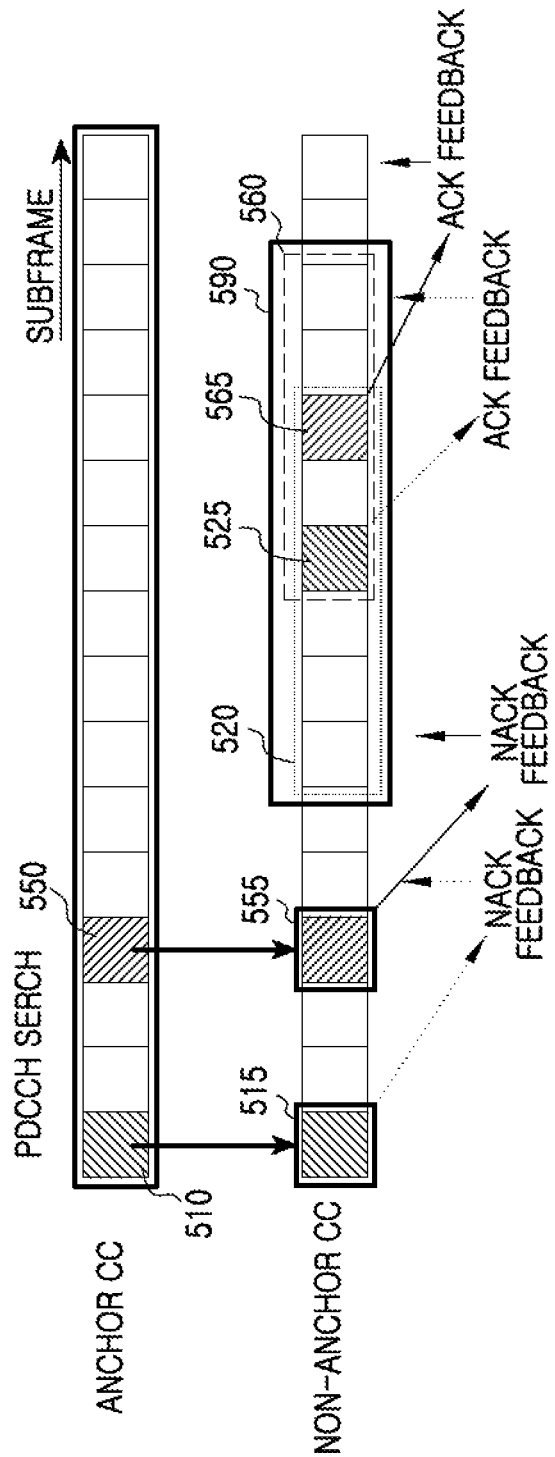
FIG. 5 illustrates a search time interval setting method with a plurality of HARQ processes according to an exemplary embodiment of the present invention.

FIG. 5 illustrates a search time interval setting method for a plurality of HARQ processes according to an exemplary embodiment of the present invention.

Referring to FIG. 5, when the eNode B transmits data using the plurality of HARQ processes, retransmission can occur in each HARQ process and the time interval predicted for retransmission in the non-anchor CC can differ per HARQ process.

While two subframes 510 and 550 that include resource allocation information are detected in the anchor CC of the UE, a detection error occurs in subframes 515 and 555, which include resource allocation information in the non-anchor CC, and the resulting NACK feedback is generated in two HARQ processes.

In the non-anchor CC, the resource allocation information search time intervals corresponding to the HARQ processes are set to 6 subframes 520 and 5 subframes 560 respectively, such that three subframes overlap. In this case, the search time interval is set to 8 subframes 590 which is the union of the two time intervals.

In the search time interval of 8 subframes 590, the UE waits to detect the resource allocation information in subframes 525 and 565 as the failed resource allocation information of subframes 515 and 555.

Now, a description is made of an exemplary resource allocation information search region setting method in which a UE searches resource allocation information of a non-anchor CC.

Figure 6:
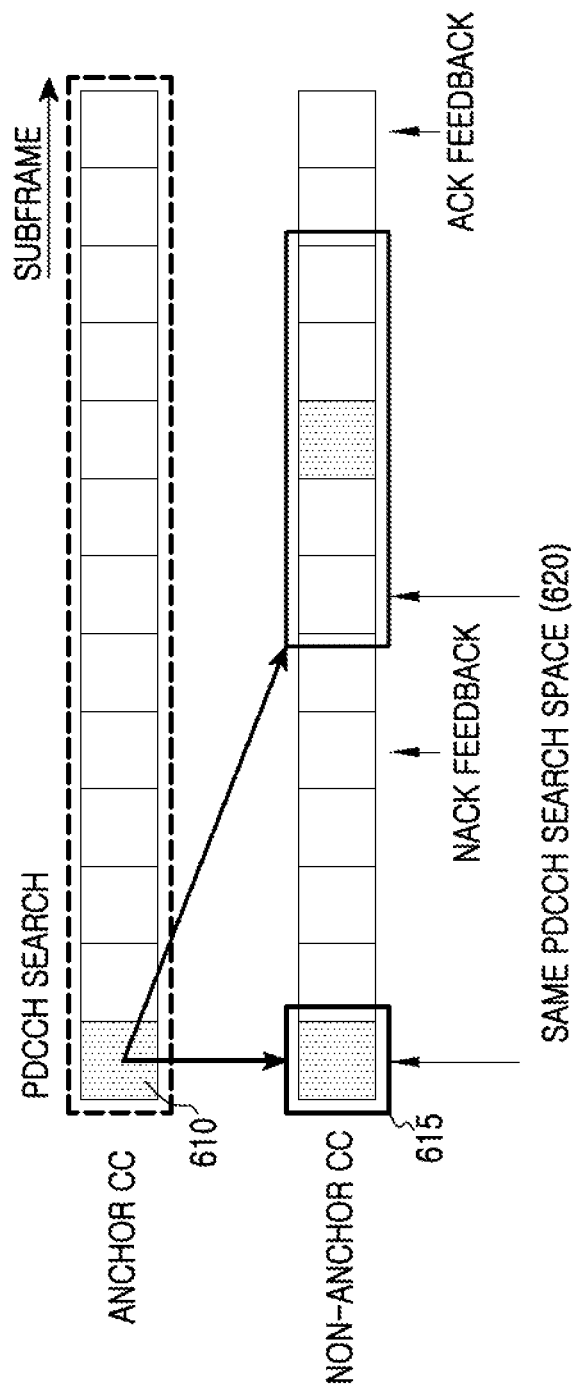
FIG. 6 illustrates a resource allocation information search region setting method of a User Equipment (UE) with one HARQ process according to an exemplary embodiment of the present invention.

FIG. 6 illustrates a resource allocation information search region setting method of a UE with one HARQ process according to an exemplary embodiment of the present invention.

Referring to FIG. 6, when detecting resource allocation information in subframe 610 of the anchor CC but failing to detect resource allocation information in subframe 615 of the non-anchor CC, the UE generates and sends NACK to the eNode B. After two subframes following NACK transmission, the UE searches in a search time interval 620 to detect retransmission of the failed resource allocation information of subframe 615 of the non-anchor CC. When the UE searches the resource allocation information in the non-anchor CC, the search space is the same as in the initial resource allocation information search or the retransmitted resource allocation information search.

Figure 7:
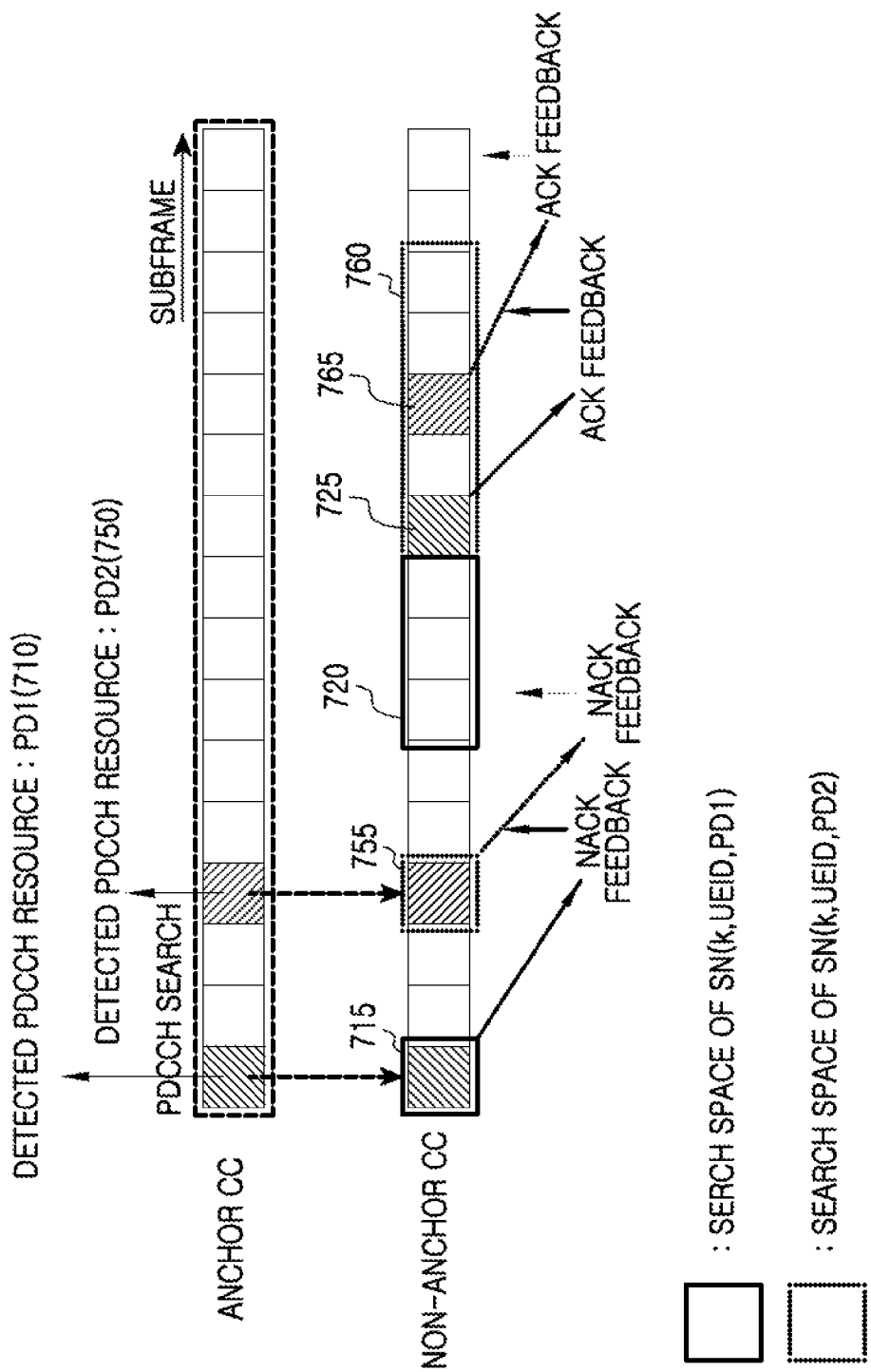
FIG. 7 illustrates a resource allocation information search region setting method of a UE with a plurality of HARQ processes according to an exemplary embodiment of the present invention.

FIG. 7 illustrates a resource allocation information search region setting method of a UE with a plurality of HARQ processes according to an exemplary embodiment of the present invention.

Referring to FIG. 7, when detecting resource allocation information in subframes 710 and 750 of the anchor CC but failing to detect resource allocation information in subframes 715 and 755 of the non-anchor CC, the UE sends NACK to the appropriate eNode Bs.

As for the first NACK feedback, after two subframes, the UE searches in a search time interval 720 to detect retransmission of the failed resource allocation information of subframe 715 in the non-anchor CC. In the resource allocation information search in the non-anchor CC, the search space is the same as in the initial resource allocation information search or the retransmitted resource allocation information search.

However, regarding the second NACK feedback, after two subframes, the UE searches in a search time interval 760 to detect the retransmission of the failed resource allocation information of subframe 765 in the non-anchor CC. In the resource allocation information search in the non-anchor CC, the search space is the same as in the initial resource allocation information search or the retransmitted resource allocation information search.

When the search time intervals overlap each other, the later corresponding search space 760 is used for the search in the overlapped search time interval. That is, when the search time intervals of the resource allocation information of subframes 715 and 755 overlap, the search space 760 of the resource allocation information of subframe 765 is applied to the search. Herein, the resource allocation information 725 indicates ACK feedback of the transmit resource.

Figure 8:
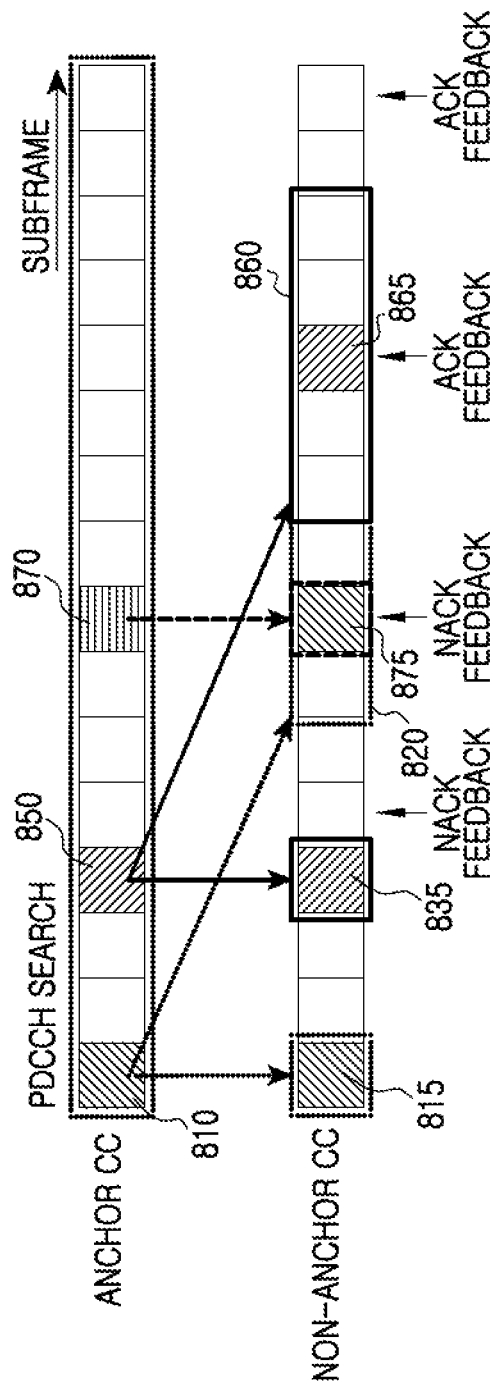
FIG. 8 illustrates a resource allocation information search region setting method of a UE with a plurality of HARQ processes when new resource allocation information is found according to an exemplary embodiment of the present invention.

FIG. 8 illustrates a resource allocation information search region setting method of a UE with a plurality of HARQ processes when new resource allocation information is found according to an exemplary embodiment of the present invention.

Referring to FIG. 8, when detecting resource allocation information in subframes 810 and 850 of the anchor CC but failing to detect resource allocation information in subframes 815 and 835 of the non-anchor CC, the UE sends NACK to each appropriate eNode B.

As for the first NACK feedback, after two subframes, the UE searches in a search time interval 820 to detect the retransmission of the failed resource allocation information of subframe 815 of the non-anchor CC. In the resource allocation information search in the non-anchor CC, the search space is the same as in the initial resource allocation information search or the retransmitted resource allocation information search.

However, as for the second NACK feedback, after two subframes, the UE searches in a search time interval 860 to detect retransmission of the failed resource allocation information of subframe 835 of the non-anchor CC. In the resource allocation information search in the non-anchor CC, the search space is the same as in the initial resource allocation information search or the retransmitted resource allocation information search.

When the search time intervals overlap each other, a later corresponding search space is used for the search in the overlapped search time interval. That is, when the search time intervals of the resource allocation information 865 overlap, the search space corresponding to the resource allocation information 865 is applied to the search.

When the UE additionally detects new resource allocation information in subframe 870 of the anchor CC, only during the corresponding subframe time interval, the search space of the non-anchor CC for the resource allocation information of subframe 870 of the anchor CC is applied to the detection of resource allocation information of subframe 875 in the non-anchor CC.

Figure 9:
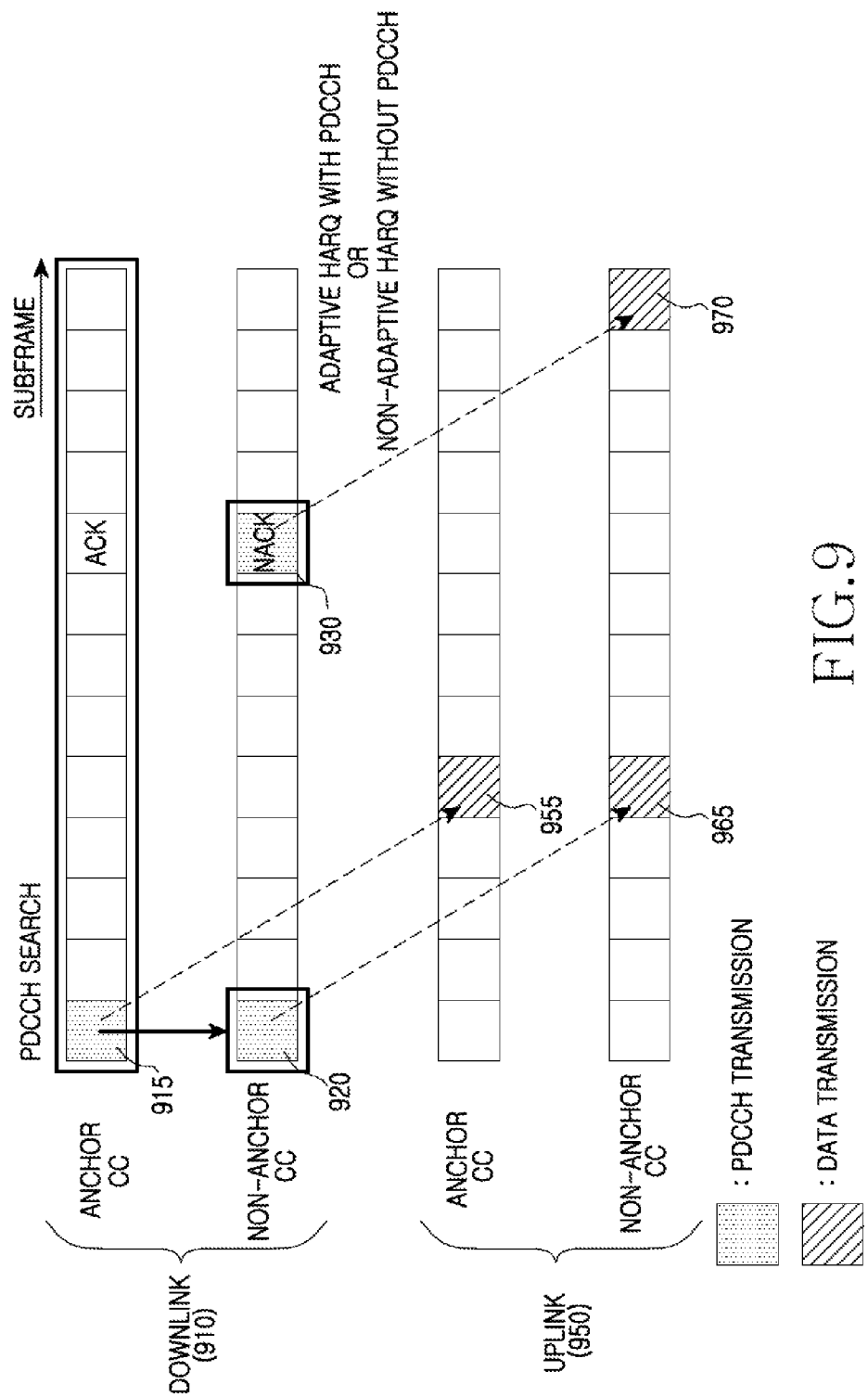
FIG. 9 illustrates a resource allocation information searching process using synchronous HARQ in an uplink according to an exemplary embodiment of the present invention.

FIG. 9 illustrates a resource allocation information searching process using synchronous HARQ in an uplink according to an exemplary embodiment of the present invention.

Referring to FIG. 9, based on the synchronous manner, when the NACK feedback occurs, the eNode B and the UE are aware of when the retransmitted resource allocation information or the retransmit data is generated in the non-anchor CC.

The subframe time interval carrying ACK/NACK information is the subframe region defined to deliver the resource allocation information. In this subframe interval, the resource allocation information is searched in the anchor CC and the non-anchor CC as well.

The resource allocation information of subframe 915 is detected in the anchor CC of the downlink 910 of the UE, and the resource allocation information of subframe 920 is detected in the non-anchor CC.

Next, while data of subframes 955 and 965 is transmitted from the UE to the eNode B in the non-anchor CC of the uplink 950, the data reception in the non-anchor CC fails and the NACK feedback of subframe 930 is generated. In this case, the eNode B can successfully receive the retransmitted data of subframe 970 of the non-anchor CC though there is no data transmission of the anchor CC in the uplink 950.

Figure 10:
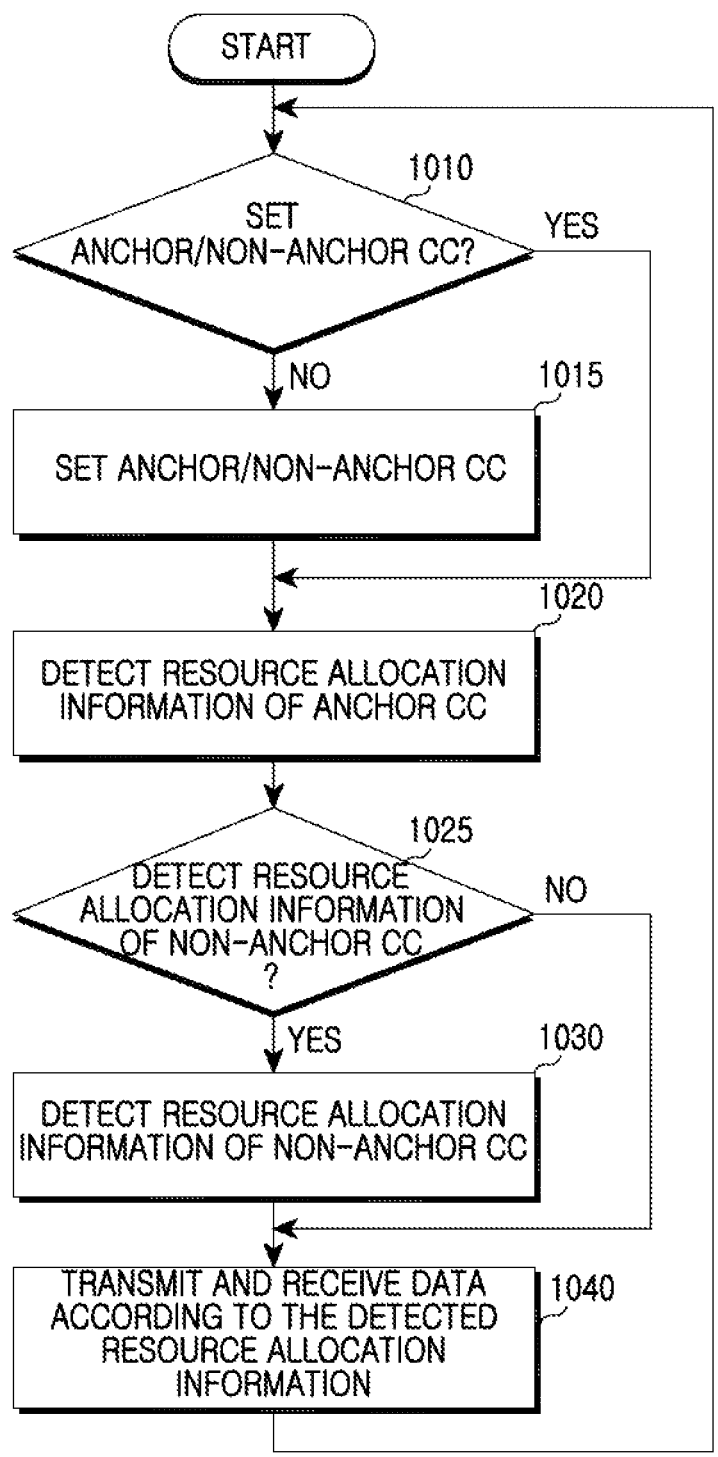
FIG. 10 illustrates a resource allocation information detecting process of a UE according to an exemplary embodiment of the present invention.

FIG. 10 illustrates a resource allocation information detecting process of a UE according to an exemplary embodiment of the present invention.

Referring to FIG. 10, it is determined if the anchor and non-anchor CCs are set by signaling with the eNode B in step 1010. If it is determined in step 1010 that the anchor and non-anchor CCs are set, the UE detects the resource allocation information in the anchor CC in step 1020. On the other hand, if it is determined in step 1010 that the anchor and non-anchor CCs are not set, the UE sets the anchor and non-anchor CCs by signaling with the eNode B in step 1015 and detects the resource allocation information in the determined anchor CC in step 1020. The signaling follows a procedure defined by the standard.

In step 1025, the UE determines if it is to detect resource allocation information in the non-anchor CC. If the UE determines in step 1025 that it is to detect resource allocation information in the non-anchor CC, the UE detects resource allocation information of the non-anchor CC in step 1030 and transmits and receives data according to the detected resource allocation information in step 1040.

On the other hand, if the UE determines in step 1025 that it is not to detect resource allocation information in the non-anchor CC, the UE transmits and receives data according to the detected resource allocation information in step 1040. The resource allocation information in step 1040 indicates the previously detected resource allocation information.

When detecting the resource allocation information in the anchor CC, the UE determines the resource allocation information search region of the non-anchor CC according to the resource size and location of the detected resource allocation information.

The search region of the anchor CC is expressed as a function SA(k,m,UEID) and the search region of the non-anchor CC can be expressed as a function SN(k,m,UEID, SD).

In the above functions, k denotes the subframe number, m denotes the CC number, UEID denotes the ID of the UE, and SD denotes the resource size and location of the resource allocation information detected in the anchor CC.

That is, the search region of the anchor CC is determined by the subframe number, the CC number, and the UE ID. The search region of the non-anchor CC is determined by the subframe number, the UE ID, and the resource location and size of the information detected in the anchor CC.

When detecting no resource allocation information in the anchor CC, the UE searches the resource allocation information in the non-anchor CC using the search region used in the past.

For example, the UE can select one of the HARQ processes predicted to deliver the retransmission in the current subframe of the non-anchor CC, and define the resource allocation information search region used in the previous transmission of the selected HARQ process as the search region of the current subframe.

More specifically, the resource allocation information search region of the non-anchor CC is expressed as SN(k,m, UEID,SD_mem), where k denotes the subframe number, UEID denotes the ID of the UE, and SD_mem is defined as follows. That is, when the resource allocation information search region in the non-anchor CC is set to SN(k,m,UEID, SD), the decoding of the received data fails, and the NACK is fed back, SD_mem after two subframes based on the NACK feedback subframe can be set to SD.

Figure 11:
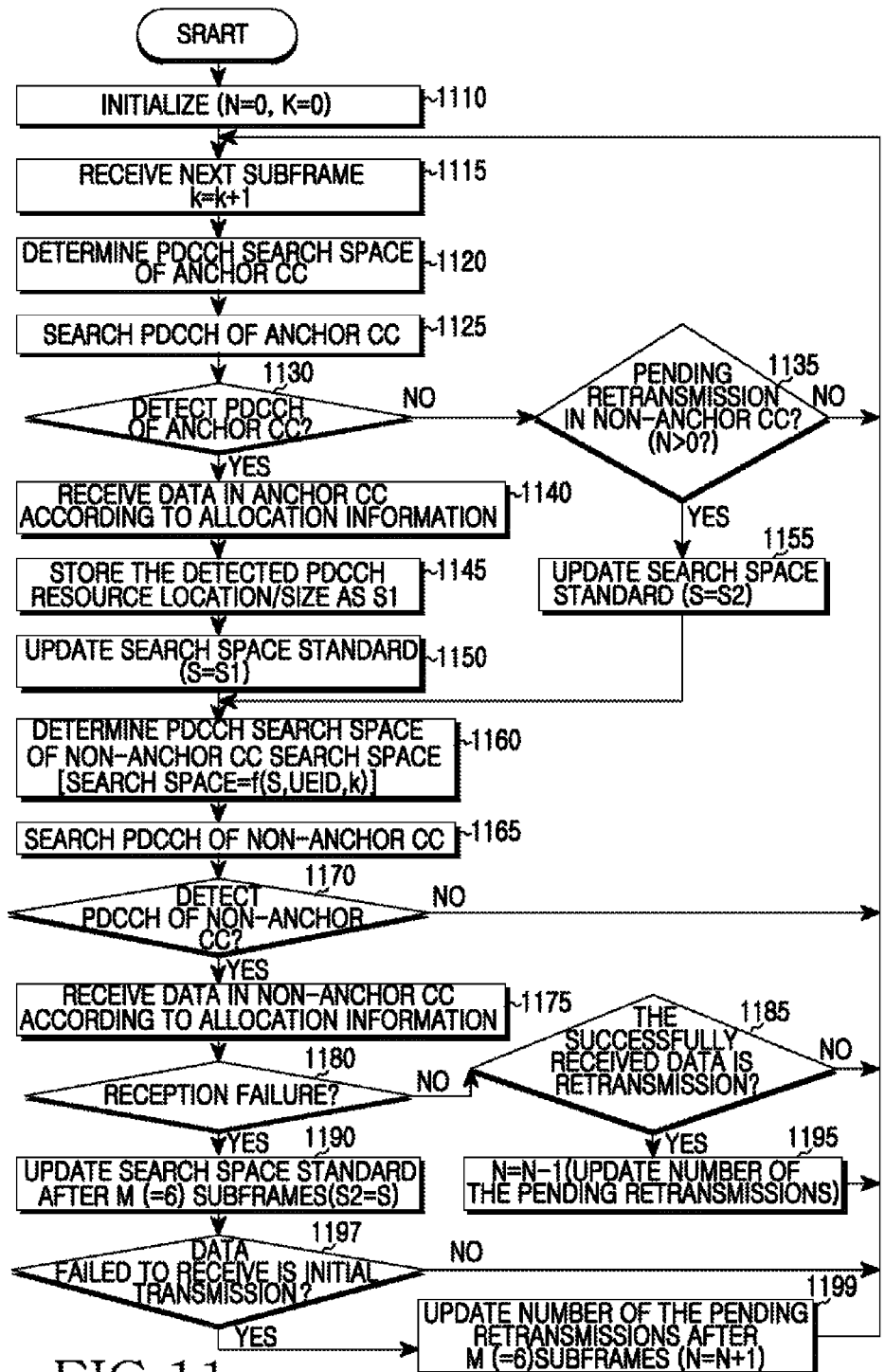
FIG. 11 illustrates a resource allocation information detecting process of a UE according to an exemplary embodiment of the present invention.

FIG. 11 illustrates a resource allocation information detecting process of a UE according to an exemplary embodiment of the present invention.

Referring to FIG. 11, the UE initializes variables (N, k) used in the algorithm in step 1110. The UE receives the next subframe; that is the subframe to process in step 1115. Herein, N denotes the number of pending resource allocation information or data to retransmit, and k denotes the subframe number.

The UE determines the PDCCH search space of the anchor CC in step 1120 and searches the PDCCH, that is, the resource allocation information in the determined search space in step 1125.

In step 1130, the UE determines if the PDCCH is detected. Upon detecting the PDCCH, that is, upon detecting the resource allocation information in step 1130, the UE receives data in the anchor CC using the resource allocation information in step 1140.

Next, the UE sets the resource of the detected PDCCH, that is, the size and the location of the detected resource allocation information to S1 in step 1145, and sets S1 to a search space standard S of the current non-anchor CC (S=S1) in step 1150. This represents that the standard S of the search space of the current non-anchor CC is set to S1.

On the other hand, when the PDCCH is not detected in step 1130 and if it is determined that there exists pending retransmission resource allocation information to receive in the non-anchor CC in step 1135, the UE updates the standard of the search space (S=S2) in step 1155. S denotes the standard of the search space to use in the current non-anchor CC, and S2 denotes the standard of the search space used in the initial transmission of the resource allocation information to retransmit in the non-anchor CC. Namely, the standard of the search space to currently use is set to the standard of the search space previously used.

The UE determines the PDCCH search space in the non-anchor CC using the search space standard S (S,UEID,k) in step 1160, and searches the PDCCH of the non-anchor CC, that is, the resource allocation information in the determined search space in step 1165. The search space standard setting and the search space setting conform to the procedures defined by the standard.

In step 1170, the UE determines if the PDCCH is detected in the non-anchor CC. If it is determined that the UE detects the PDCCH, that is, the resource allocation information in the non-anchor CC in step 1170, the UE receives data from the non-anchor CC according to the resource allocation information in step 1175.

In step 1180, the UE determines if it fails to receive the data of step 1175. If it is determined in step 1180 that there was a failure in reception of the data, the UE updates the standard of the search space (S2=S) to use in the non-anchor CC after M (=6) subframes, that is, stores the standard S of the current search space to S2 in step 1190.

In step 1197, the UE determines if the data that failed to be received is the initial transmission. If the UE determines in step 1197 that the data that failed to be received in step 1175 is the initial transmission, the UE increases the number of the pending resource allocation information or data to retransmit, which is to be taken into account after M (=6) subframes, by one in step 1199.

If the UE determines in step 1180 that there is not a data reception failure of step 1175 is successfully received in step 1180, the UE determines in step 1185 if the successfully received data is a retransmission. If the UE determines in step 1185 that the successfully received data is retransmitted, the UE decreases the number of the pending resource allocation information or data to retransmit by one in step 1195.

Next, the UE receives a next frame in step 1115 and then repeats the subsequent steps.

In summary, when receiving the resource allocation information in the anchor CC, the UE obtains parameters for determining the search space to use in the non-anchor CC from the resource allocation information, and determines the search space to use in the non-anchor CC using the determined parameters.

Using the determined search space, the UE searches the resource allocation information in the non-anchor CC. Upon detecting the resource allocation information, the UE receives data in the non-anchor CC according to the detected resource allocation information.

When the UE fails to receive the data, the NACK feedback is generated, which is not illustrated. After the NACK feedback, the UE determines whether the data is retransmitted in the corresponding subframe, determined using the search space used when the data reception fails in the non-anchor CC.

The determined corresponding subframe can vary according to the synchronous HARQ or the asynchronous HARQ as stated earlier.

Figure 12:
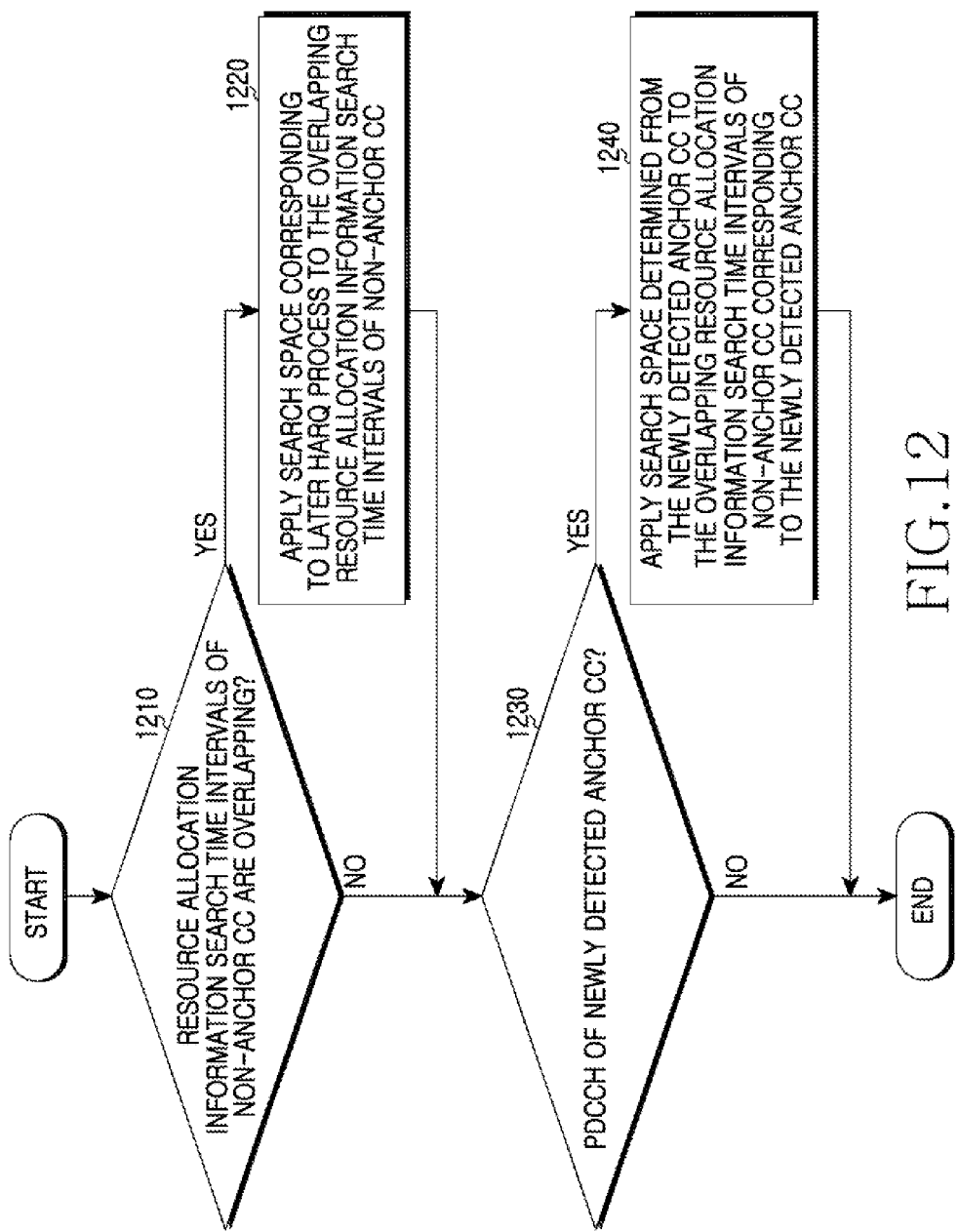
FIG. 12 illustrates a search space setting method with a plurality of HARQ processes according to an exemplary embodiment of the present invention.

FIG. 12 illustrates a search space setting method with a plurality of HARQ processes according to an exemplary embodiment of the present invention.

Referring to FIG. 12, it is determined in step 1210 if the resource allocation information search time intervals of the non-anchor CC overlap each other. When there is a plurality of HARQ processes and the resource allocation information search time intervals of the non-anchor CC overlap each other, the search time corresponding to the later HARQ process is applied to the overlapping resource allocation information search time intervals in the non-anchor CC in step 1220.

That is, when the subframe intervals waiting for retransmission in the non-anchor CC overlap each other, the search space used in the recent HARQ process is applied to the overlapping subframe intervals.

On the other hand, if it is determined in step 1210 that the resource allocation information search time intervals of the non-anchor CC do not overlap each other, it is determined in step 1230 if a PDCCH of the newly detected anchor CC is present. When a PDCCH of the newly detected anchor CC is present, that is, when new resource allocation information is detected in the anchor CC in step 1230, the search space determined from the newly detected anchor CC is applied to the overlapping resource allocation information search time intervals of the non-anchor CC corresponding to the newly detected anchor CC in step 1240.

That is, in step 1240, the search space determined from the newly detected anchor CC is applied to the subframe overlapping the non-anchor CC corresponding to the newly detected anchor CC.

Figure 13:
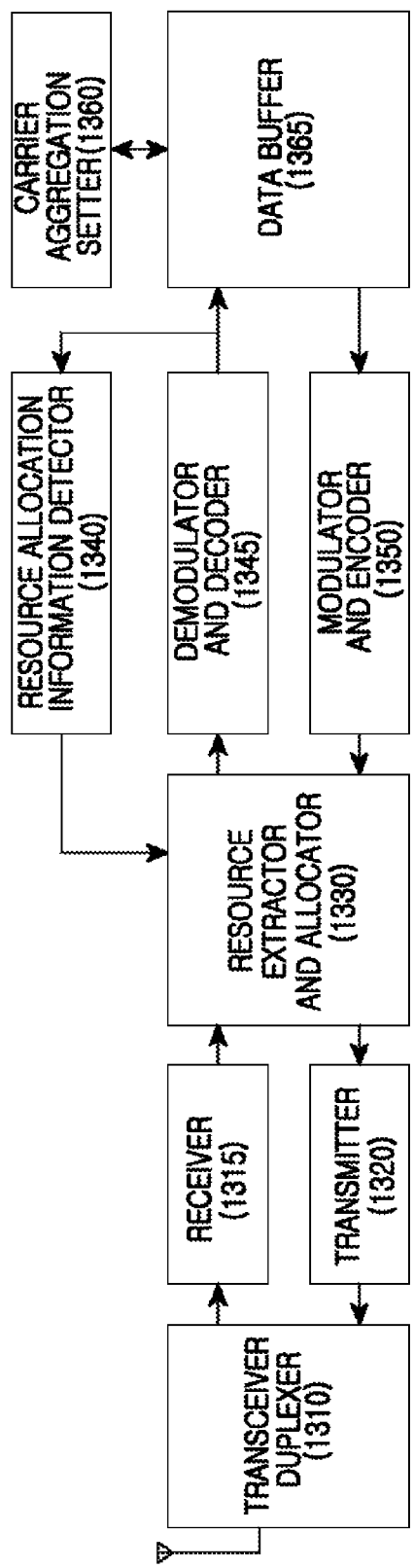
FIG. 13 is a block diagram of a UE according to an exemplary embodiment of the present invention.

FIG. 13 is a block diagram of a UE according to an exemplary embodiment of the present invention.

Referring to FIG. 13, the UE includes a transceiver duplexer 1310, a receiver 1315, a transmitter 1320, a resource extractor and allocator 1330, a resource allocation information detector 1340, a demodulator and decoder 1345, a modulator and encoder 1350, a carrier aggregation setter 1360, and a data buffer 1365.

Based on the duplexing scheme, the transceiver duplexer 1310 forwards a receive signal from an antenna to the receiver 1315, and transmits a signal output from the transmitter 1320 over the antenna.

The receiver 1315 converts a Radio Frequency (RF) signal output from the transceiver duplexer 1310 to an analog signal, converts the analog signal to sample data, and outputs the sample data to the resource extractor and allocator 1330.

The transmitter 1320 converts the output data from the resource extractor and allocator 1330 to an analog signal, converts the analog signal to an RF signal, and outputs the RF signal to the transceiver duplexer 1310.

The resource extractor and allocator 1330 extracts the corresponding resource from the sample data output from the receiver 1315 according to its anchor CC and non-anchor CC, and outputs the extracted resource to the demodulator and decoder 1345. Alternatively, the resource extractor and allocator 1330 includes the data output from the modulator and encoder 1350 with its anchor CC and non-anchor CC and outputs the data to the transmitter 1330.

The demodulator and decoder 1345 demodulates and decodes the output data from the resource extractor and allocator 1330 according to a defined demodulation and decoding scheme, and outputs the data to the data buffer 1365 by subframes.

The modulator and encoder 1350 modulates and encodes the output data from the data buffer 1365 according to a defined modulation and encoding scheme, and outputs the data to the resource extractor and allocator 1330.

The data buffer 1365 stores the subframes output from the demodulator and decoder 1345 and outputs the stored data to the upper layer. The data buffer 1365 also stores data received from the upper layer and outputs the stored data to the modulator and encoder 1350.

The resource allocation information detector 1340 searches the resource allocation information in the anchor CC per subframe received, searches the resource allocation information of the non-anchor CC in the defined time interval, and outputs the results to the resource extractor and allocator 1330. The time interval and the search region for the resource allocation information search of the non-anchor CC are determined by the resource allocation information detector 1340 according to the data transmission and reception result. The resource allocation information detected in the anchor and non-anchor CCs is forwarded to the resource extractor and allocator 1330, and the data transmission and reception is performed using the corresponding resource.

The carrier aggregation setter 1360 determines the anchor and non-anchor CCs by signaling with the eNode B.

Herein, a controller, which is not illustrated, can function as the resource allocation information detector 1340 and the carrier aggregation setter 1360.

In an exemplary implementation, the controller can process all or part of the functions of the resource allocation information detector 1340 and the carrier aggregation setter 1360.

Figure 14:
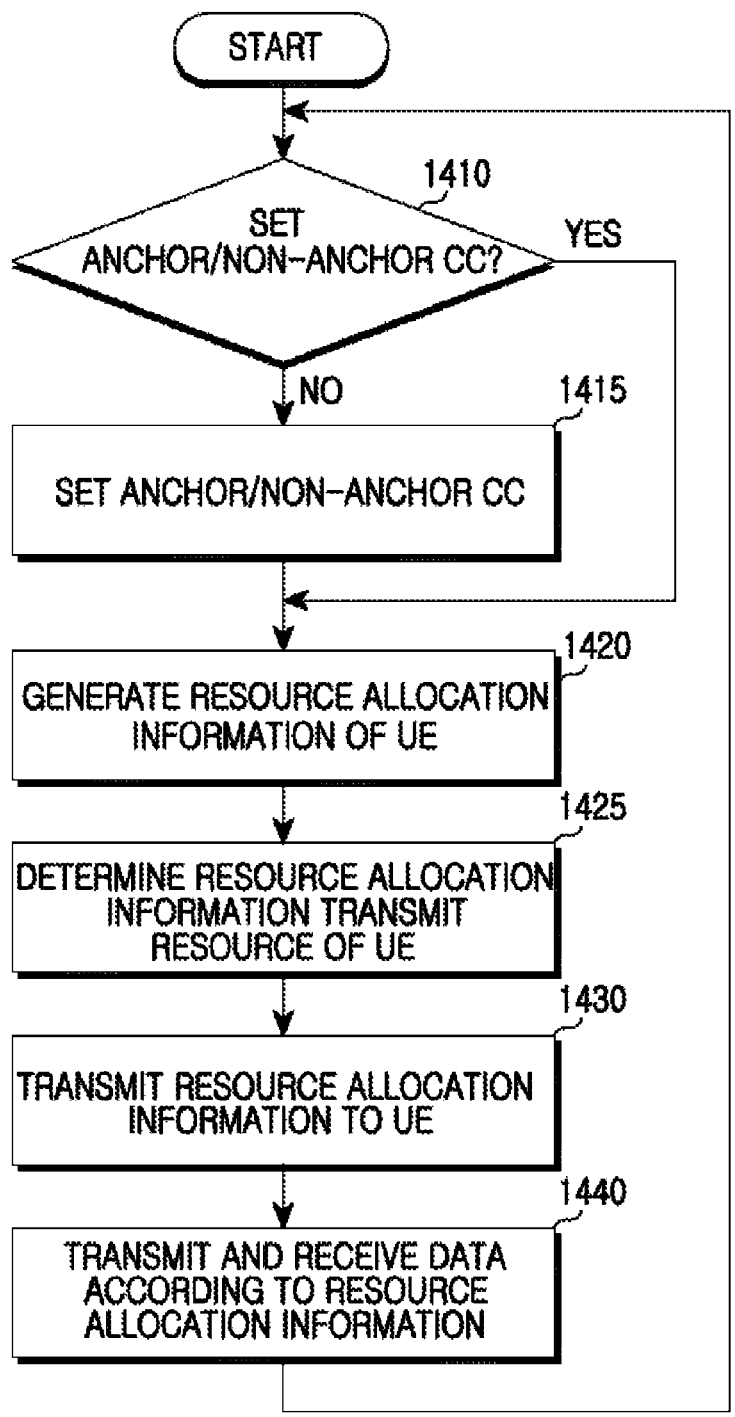
FIG. 14 illustrates operations of an eNode B according to an exemplary embodiment of the present invention.

FIG. 14 illustrates operations of an eNode B according to an exemplary embodiment of the present invention.

Referring to FIG. 14, the eNode B determines in step 1410 if the anchor and non-anchor CCs are set by signaling with the UE. When it is determined in step 1410 that the anchor and non-anchor CCs are set, the eNode B generates the resource allocation information for the corresponding UE in step 1420 and determines the transmit resource for carrying the resource allocation information in step 1425. The signaling conforms to the procedure defined by the standard.

The eNode B transmits the resource allocation information to the corresponding UE in step 1430 and transmits and receives data to and from the corresponding UE according to the resource allocation information in step 1440.

When it is determined that the anchor and non-anchor CCs are not defined in step 1410, the eNode B sets the anchor and non-anchor CCs by signaling with the UE in step 1415.

Next, the eNode B generates the resource allocation information for the corresponding UE in step 1420 and determines the transmit resource for carrying the resource allocation information in step 1425.

The eNode B transmits the resource allocation information to the corresponding UE in step 1430 and transmits and receives data to and from the corresponding UE according to the resource allocation information in step 1440.

During generation of the resource allocation information for retransmission, the eNode B generates the resource allocation information such that the resource for the retransmission is included only for the non-anchor CC, not for the anchor CC. The eNode B identically defines the search space of the non-anchor CC in the retransmission as in the non-anchor CC band of the initial transmission.

Figure 15:
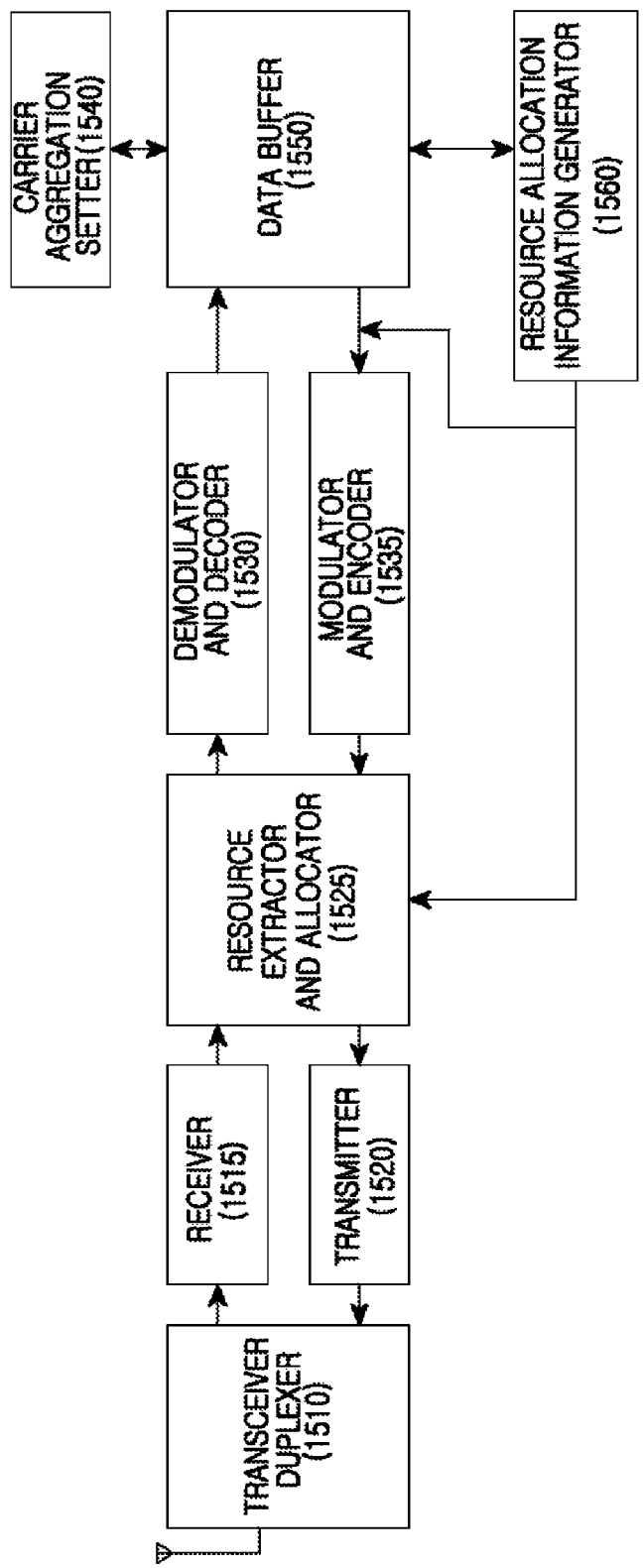
FIG. 15 is a block diagram of an eNode B according to an exemplary embodiment of the present invention.

FIG. 15 is a block diagram of an eNode B according to an exemplary embodiment of the present invention.

Referring to FIG. 15, the eNode B includes a transceiver duplexer 1510, a receiver 1515, a transmitter 1520, a resource extractor and allocator 1525, a demodulator and decoder 1530, a modulator and encoder 1535, a carrier aggregation setter 1540, a data buffer 1550, and resource allocation information generator 1560.

Based on the duplexing scheme, the transceiver duplexer 1510 forwards a received signal from an antenna to the receiver 1515, and transmits a signal output from the transmitter 1520 over the antenna.

The receiver 1515 converts an RF signal output from the transceiver duplexer 1510 to an analog signal, converts the analog signal to sample data, and outputs the sample data to the resource extractor and allocator 1525.

The transmitter 1520 converts output data from the resource extractor and allocator 1525 to an analog signal, converts the analog signal to an RF signal, and then outputs the RF signal to the transceiver duplexer 1510.

The resource extractor and allocator 1525 extracts the corresponding resource from the sample data output from the receiver 1515 according to its anchor CC and non-anchor CC, and outputs the extracted resource to the demodulator and decoder 1530. Alternatively, the resource extractor and allocator 1525 includes the output data from the modulator and encoder 1535 to the resource information, that is, to its anchor CC and non-anchor CC and outputs the data to the transmitter 1520.

The demodulator and decoder 1530 demodulates and decodes the resource output from the resource extractor and allocator 1525 according to a defined demodulation and decoding scheme, and outputs the data to the data buffer 1550 by subframes.

The modulator and encoder 1535 modulates and encodes the output data from the data buffer 1550 according to a defined modulation and encoding scheme, and outputs the data to the resource extractor and allocator 1525.

The data buffer 1550 stores the subframes output from the demodulator and decoder 1530 and outputs the stored data to the upper layer. The data buffer 1550 stores data received from the upper layer and outputs the stored data to the modulator and encoder 1530.

The resource allocation information generator 1560 determines the transmission resource for transmitting to and receiving from each UE, per subframe, and generates the resource allocation information for the UE. The generated resource allocation information is forwarded to the resource extractor and allocator 1525 and transmitted to and received from the UEs over the corresponding resources.

The carrier aggregation setter 1540 determines the anchor and non-anchor CCs by signaling with the UE.

Herein, a controller, which is not illustrated, can function as the carrier aggregation setter 1540 and the resource allocation information generator 1560.

In an exemplary implementation, the controller can process all or part of the functions of the carrier aggregation setter 1540 and the resource allocation information generator 1560.

By addressing the high reception complexity and the HARQ retransmission constraints, the HARQ retransmission can be accomplished with the low reception complexity and the non-anchor CC alone.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving resource allocation information in a mobile communication system, the method comprising:
   determining, by a controller, a search space for use in a second frequency band using resource allocation information of a first process detected in a first frequency band;
   detecting, by the controller, resource allocation information of the first process using the search space in the second frequency band; and
   re-detecting, by the controller, resource allocation information of the first process in the second frequency band in a first time interval using the search space without detecting the resource allocation information of the first process in the first frequency band when failing to decode received data according to the resource allocation information detected in the second frequency band,
   wherein when resource allocation information of a second process is detected in the first frequency band and a search space of the second process overlaps the search space of the first process, the search space of the second process is used for the search in the overlapped search space.

2. The method of claim 1, further comprising, before the detecting of the resource allocation information of the first process in the first frequency band, determining, by the controller, the first frequency band and the second frequency band.

3. The method of claim 1, wherein the first frequency band is an anchor Component Carrier (CC), the second frequency band is a non-anchor CC, and wherein the first time interval ranges from the decoding failure of data received in the second frequency band and Negative ACKnowledgement (NACK) feedback to a maximum time interval of the possible retransmission.

4. The method of claim 1, further comprising:
   determining, by the controller, whether resource allocation information of a second process is detected in the first frequency band;
   determining, by the controller, a search space of the second process using the resource allocation information of the second process when detecting the resource allocation information of the second process;
   determining, by the controller, whether the search space of the second process overlaps the search space;
   determining, by the controller, the search space from the overlapping time interval as a search space of the second process when the search space of the second process overlaps the search space; and
   re-detecting, by the controller, resource allocation information of the second process in the second frequency band using the newly determined search space without detecting the resource allocation information of the second process in the first frequency band.

5. The method of claim 1, wherein the determining of the search space for use in the second frequency band using resource allocation information of the first process detected in a first frequency band comprises using the following equation:

$$SN(k,m,UEID,SD)$$

wherein k denotes a subframe number, m denotes a number of the first frequency band, UEID denotes an ID of a receiver, and SD denotes a resource size and location of the resource allocation information detected in the first frequency band.

6. The method of claim 4, further comprising, in the overlapping time interval:
   determining, by the controller, whether resource allocation information of a third process is detected in the first frequency band;
   determining, by the controller, a search space of the third process using the resource allocation information of the third process when detecting the resource allocation information of the third process;
   determining, by the controller, the search space of the third process as the search space in a resource allocation information detection time interval of the second frequency band according to the resource allocation information of the third process; and
   re-detecting, by the controller, resource allocation information of the third process in the second frequency band using the newly determined search space without detecting the resource allocation information of the third process in the first frequency band.

7. An apparatus for receiving resource allocation information in a mobile communication system, the apparatus comprising:
   a controller for determining a search space for use in a second frequency band using resource allocation information of a first process detected in a first frequency band, for detecting resource allocation information of the first process using the search space in the second frequency band, and, when failing to decode received data according to the resource allocation information detected in the second frequency band, for re-detecting resource allocation information of the first process in the second frequency band in a first time interval using the search space without detecting the resource allocation information of the first process in the first frequency band, wherein when resource allocation information of a second process is detected in the first frequency band and a search space of the second process overlaps the search space of the first process, the search space of the second process is used for the search in the overlapped search space.

8. The apparatus of claim 7, wherein, before the detecting of the resource allocation information of the first process in the first frequency band, the controller determines the first frequency band and the second frequency band.

9. The apparatus of claim 7, wherein the first frequency band is an anchor Component Carrier (CC), the second frequency band is a non-anchor CC, and wherein the first time interval ranges from the decoding failure of data received in the second frequency band and Negative ACKnowledgement (NACK) feedback to a maximum time interval of the possible retransmission.

10. The apparatus of claim 7, wherein the controller determines whether resource allocation information of a second process is detected in the first frequency band,
   when detecting the resource allocation information of the second process, determines a search space of the second process using the resource allocation information of the second process,
   determines whether the search space of the second process overlaps the search space,
   when the search space of the second process overlaps the search space, determines the search space from the overlapping time interval as a search space of the second process, and
   re-detects resource allocation information of the second process in the second frequency band using the newly determined search space without detecting the resource allocation information of the second process in the first frequency band.

11. The apparatus of claim 7, wherein the controller determines the search space for use in the second frequency band using resource allocation information of the first process detected in a first frequency band comprises by using the following equation:

$$SN(k,m,UEID,SD)$$

wherein k denotes a subframe number, m denotes a number of the first frequency band, UEID denotes an ID of a receiver, and SD denotes a resource size and location of the resource allocation information detected in the first frequency band.

12. The apparatus of claim 10, wherein, in the overlapping time interval, the controller determines whether resource allocation information of a third process is detected in the first frequency band,
   when detecting the resource allocation information of the third process, determines a search space of the third process using the resource allocation information of the third process,
   only in a resource allocation information detection time interval of the second frequency band according to the resource allocation information of the third process, determines the search space of the third process as the search space, and
   re-detects resource allocation information of the third process in the second frequency band using the newly determined search space without detecting the resource allocation information of the third process in the first frequency band.

13. A method for transmitting resource allocation information in a mobile communication system, the method comprising:
- generating, by a controller, the resource allocation information such that a resource for the retransmission is not included in a first frequency band and is included only in a second frequency band when generating resource allocation information for retransmission;
- determining, by the controller, a transmission resource using the resource allocation information;
- transmitting, by a modem, the resource allocation information to a receiver using the transmission resource; and
- setting a search space of the second frequency band using the following equation:

$$SN(k,m,UEID,SD)$$

wherein k denotes a subframe number, m denotes a number of the first frequency band, UEID denotes an ID of a receiver, and SD denotes a resource size and location of the resource allocation information detected in the first frequency band.

14. The method of claim 13, further comprising:
- setting, by the controller, the search space of the second frequency band of the retransmission identically to the second frequency band of an initial transmission; and
- before generating the resource allocation information, determining, by the controller, the first frequency band and the second frequency band.

15. The method of claim 13, wherein the first frequency band is an anchor Component Carrier (CC) and the second frequency band is a non-anchor CC.

16. An apparatus for transmitting resource allocation information in a mobile communication system, the apparatus comprising:
- a controller for, when generating resource allocation information for retransmission, generating the resource allocation information such that a resource for the retransmission is not included in a first frequency band and is included only in a second frequency band, and for determining a transmission resource using the resource allocation information; and
- a transmitter for transmitting the resource allocation information to a receiver over the transmission resource,
- wherein the controller sets a search space of the second frequency band by using the following equation:

$$SN(k,m,UEID,SD)$$

wherein k denotes a subframe number, m denotes a number of the first frequency band, UEID denotes an ID of a receiver, and SD denotes a resource size and location of the resource allocation information detected in the first frequency band.

17. The apparatus of claim 16, wherein the controller further sets the search space of the second frequency band of the retransmission identically to the second frequency band of an initial transmission; and
- before generating the resource allocation information, determines the first frequency band and the second frequency band,
- wherein the first frequency band is an anchor Component Carrier (CC) and the second frequency band is a non-anchor CC.

* * * * *